United States Patent [19]

Flory et al.

[11] 4,133,003

[45] Jan. 2, 1979

[54] RASTER REGISTRATION SYSTEM FOR A TELEVISION CAMERA

[75] Inventors: Robert E. Flory; Charles B. Oakley, both of Princeton, N.J.

[73] Assignee: RCA Corporation, New York, N.Y.

[21] Appl. No.: 841,196

[22] Filed: Oct. 11, 1977

[51] Int. Cl.² .............................................. H04N 9/09
[52] U.S. Cl. ..................................................... 358/51
[58] Field of Search .......................................... 358/51

[56] References Cited

U.S. PATENT DOCUMENTS

| 3,471,634 | 10/1969 | Clark et al. | 358/51 |
|---|---|---|---|
| 3,621,122 | 11/1971 | Hipwell | 358/51 |
| 3,668,305 | 6/1972 | Wright | 358/51 |
| 3,700,789 | 10/1972 | Ryley et al. | 358/51 |
| 3,700,790 | 10/1972 | Ryley | 358/51 |
| 3,764,735 | 10/1973 | Dieter-Schneider et al. | 358/51 |

FOREIGN PATENT DOCUMENTS 1222022  2/1971  United Kingdom ...................... 358/51

Primary Examiner—Richard Murray
Attorney, Agent, or Firm—Eugene M. Whitacre; Paul J. Rasmussen; Robert L. Troike

[57] ABSTRACT

A raster registration system for a television camera is provided in which the positions of the peak amplitude of two or more raster related video signals derived from scanning a common reference are detected and compared so as to generate a control signal proportional to any misregistration of the rasters. The control signal is utilized to develop raster correction signals for reducing the misregistration of the rasters.

7 Claims, 10 Drawing Figures

RASTER REGISTRATION SYSTEM FOR A TELEVISION CAMERA

BACKGROUND OF THE INVENTION

This invention relates to television camera registration systems for insuring the registration of the individual rasters developed by multiple image pickup devices.

Present day television cameras may include two or more image pickup devices for developing video signals representative of a scene being viewed. In television cameras of the multiple image pickup device type, each image device has associated means in the form of deflection components and deflection signal generators for developing a related raster signal. Although a great amount of effort is expended in the mechanical and physical alignment and the selecting or matching of the image pickup devices for deflection sensitivity, as well as the deflection components and their associated waveform generators, it is virtually impossible to achieve the desired registration or overlap of the individual rasters from each image pickup tube without some means of making fine adjustments for raster parameters, such as centering, width, height, linearity, skew and rotation of one raster relative to another raster with reference to a common scene projected optically within the same camera.

Camera systems have been developed which provide for both local and remote normal control of the aforementioned parameters; however, such adjustments are time consuming and require frequent re-adjustment in order to maintain satisfactory registration of the individual rasters in a multiple image pickup device television camera.

Automatic registration systems are therefore desirable and such systems have been developed. Generally, the method of operation of the known automatic registration systems involves developing an output video waveform from each image pickup tube, for example, by viewing a test chart and comparing the phase or time displacement of the resultant video waveforms.

The conventional phase detector, generally in the form of a level comparator circuit, compares the rising video waveform with a reference voltage level to determine the position of one raster related video signal with regard to the other raster related video signals; that is, the leading or trailing edges of the video waveform are determined, compared and an error signal generated related to the displacement of the video signals. However, the typical video waveforms from image pickup devices viewing a test chart pattern or scene are not normally identical, since the video waveforms do not represent the ideal square wave response but, rather, waveforms which rise to a peak amplitude with significantly differing rising and trailing amplitude delays.

A conventional detector is therefore unable to accurately determine the required peak video amplitude point of each raster related signal by determining coincidence of the leading or trailing edges of the multiple video waveforms.

More elaborate detectors have been developed in which multiple samples of both the leading and trailing edge crossovers with respect to a specific reference pattern are taken, and by means of an electronic computer and an elaborate software program, a determination of the peak amplitude is made for determining the difference between the raster related video waveforms.

The automatic registration systems, as described above, have not been widely accepted, because although the adjustments are made automatically, the means for detecting the misregistration of one raster relative to another either does not have a sufficient degree of accuracy; or in the case of the more elaborate detectors, the increased complexity and cost of the automatic raster registration systems is not warranted.

SUMMARY OF THE INVENTION

A raster registration system is provided for a television camera including at least two image pickup devices and means for developing related television rasters, wherein the television rasters differ in position relative to each other with regard to a common scene imaged on the pickup devices. The system comprises means for inserting a common signal generating reference having first and second boundaries in the image path of the image pickup devices for generating respective first and second raster related signals in the image pickup devices. Means are provided for selecting at least one television line common to the television rasters which contains the raster related signals, the signals increasing in amplitude from the first boundary to a peak amplitude intermediate the first and second boundaries and decreasing in amplitude from the peak amplitude to the second boundary. Means are provided for establishing a common time reference on the common television line, the common time reference occurring prior in time and position to the common signal generating reference. Clock means are provided for developing first and second reference frequencies. First and second signal translating channels, each having signal detector means are responsive to the first and second raster related signals for developing respective first and second gating signals when the first and second raster related signals exceed a given reference level. First and second counter means are coupled to the first and second reference frequencies and are responsive to the common time reference signal and the respective first and second gating signals for counting the first frequency from the common time reference to the first and second gating signals, and for counting the second frequency during the duration of said gating signals, wherein the total count of the first and second counters indicates the position of the peak amplitude of the raster related signals relative to the common time reference. Control means are coupled to the first and second counters and are responsive to the total count in the first and second counters for developing a control signal indicative of the difference in position of the related television rasters. Means coupled to the raster developing means are responsive to the control signal for minimizing the raster position difference.

DESCRIPTION OF THE PREFERRED EMBODIMENT OF THE INVENTION

Figure 1:
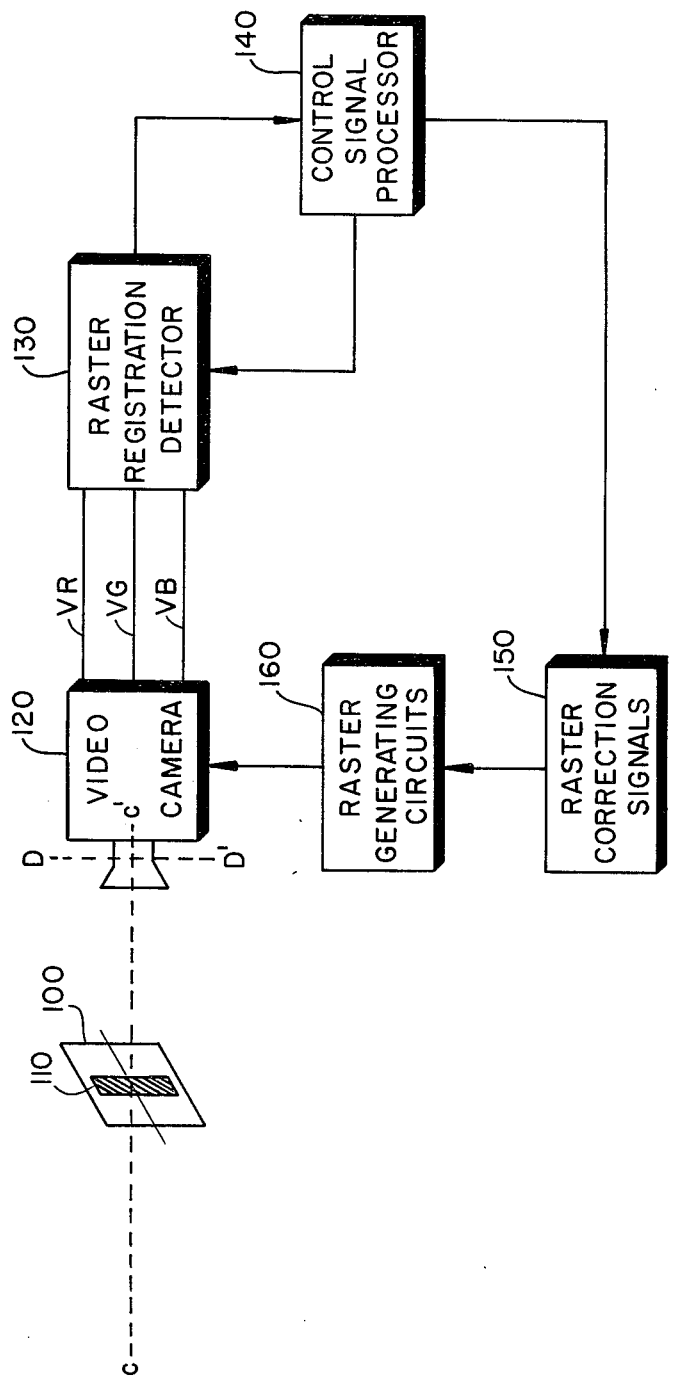
FIG. 1 is a block diagram of a raster registration system embodying the present invention.

In FIG. 1, a reference pattern chart 100, containing, for example, a white bar 110 on a black background, is placed in the image path C-C' of a video television camera 120. Alternatively, the reference pattern chart may be placed in the image path C-C' by insertion within the lens system, as illustrated by the dashed reference line D-D'.

Video camera 120, which may be a typical color television camera, containing, for example, three image pickup devices and their associated raster generating circuits 160, develops three video output signals identified as $V_R$, $V_G$, $V_B$ for the respective red, green and blue portions of the scene being viewed in the image path C-C'. Since the reference pattern chart 100 is common to the image path C-C' of all three image pickup devices, and since a white color reference represents equal amounts of red, green and blue colors, the video output signals $V_R$, $V_G$, and $V_B$ will represent output signal waveforms representative of the position of the three color related rasters; i.e., if the three image pickup device rasters are not identical in size nor in complete registration with each other, the signal waveforms from each raster will differ in position/time relative to each other.

Raster registration detector 130, as will be described in detail below, detects the position difference of the three video signals and develops an error output signal which is coupled in turn to a control signal processor 140. Control signal processor 140 determines the amount and direction of the misregistration of each raster related signal by utilizing one raster related signal as a reference, for example, the green video signal; therefore, the amount and direction of the misregistration of the red raster signal relative to the green raster signal and the blue raster signal relative to the same green raster signal, yields two control signals indicative of the displacement of the red and blue rasters from the green raster.

The red and blue difference output signals from control signal processor 140 are in turn coupled to raster correction signal generator 150 of known form whose output is coupled to the raster generating circuits 160, wherein, for example, the raster centering of the blue and red rasters are adjusted to coincide with the green raster so as to minimize any misregistration due to centering of the rasters.

In a similar fashion, other parameters of the rasters, such as height, width, linearity and skew, are adjusted by means of raster correction signals by control signal processor 140.

Figure 2:
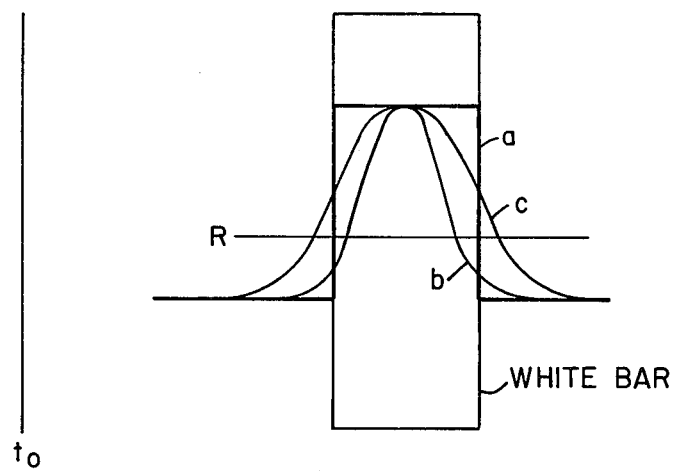
FIGS. 2, 3a-3b, 4a-4b illustrate waveforms depicting the operation of the system of FIG. 1.

The raster registration system of FIG. 1, as generally described above, therefore forms a closed loop automatic raster registration system whose primary accuracy of raster registration is dependent almost wholly on the ability of raster registration detector 130 to accurately sense position/time differences in the video output signals $V_R$, $V_G$ and $V_B$. The waveforms of FIG. 2 illustrate typical video waveforms for a video signal developed as the beam of an image pickup device traverses the image of a reference pattern card located in the image path. Waveform a of FIG. 2 illustrates an ideal response as the beam traverses the boundary from all black to all white; however, since the beam spot size is of a finite size and the system does not have an infinite bandwidth, the typical video waveform is more accurately represented by waveform b of FIG. 2. If, for example, the beam of the image pickup tube is defocussed, the resultant aperture distortion increases, and the output waveform c of FIG. 2 more accurately represents the output video waveform.

Figure 3A:
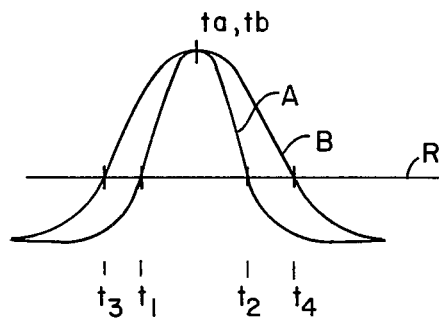
Figure 3B:
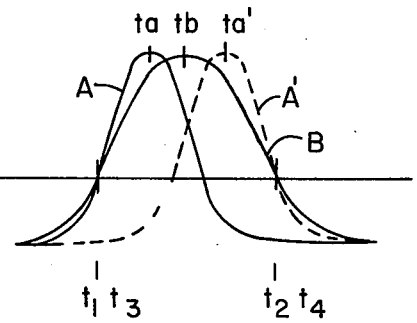

It is rarely possible to insure, either by matching or selection of image pickup tubes, that all of the video waveforms from a multiple pickup arrangement will be identical, that is, all as shown by waveform b, or as shown by waveform c of FIG. 2. It is more nearly true that a combination of the illustrated waveforms will exist in actual practice. From the waveforms of FIGS. 3 and 4, it becomes apparent then that conventional edge detectors, as previously described, are unable to accurately determine the desired peak video position. FIG. 3a represents the desired relationship for determining the time/position of the peak video output $t_a$ and $t_b$ of two displaced video waveforms A and B illustrated in FIGS. 4a, 4b. If conventional leading edge detection is utilized, then the peak video position $t_a$ of video waveform A preceeds the peak position video of position of video waveform B, as shown in FIG. 3b; similarly, if trailing edge detection is utilized, then the peak video portion of video waveform A' trails the peak video portion of video waveform B, as shown by the peak $t_a'$ of the dotted waveform A' referenced to the peak $t_b$ of the waveform B, as illustrated in FIG. 3b.

A further difficulty in utilizing edge detection is the necessity of accurately maintaining the reference level R. Referring to FIG. 3b, it becomes obvious that if the reference R moves up, then the peak video positions, indicated by $t_a$, will shift closer to peak video position $t_b$; conversely, if the reference R moves down, then video peak $t_a$ will shift farther away from video peak $t_b$.

Figure 4A:
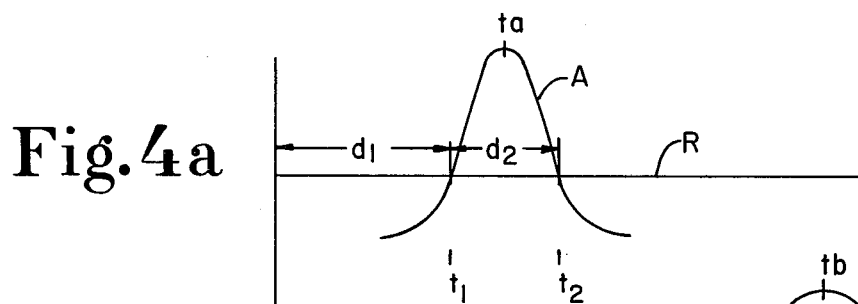
Figure 4B:
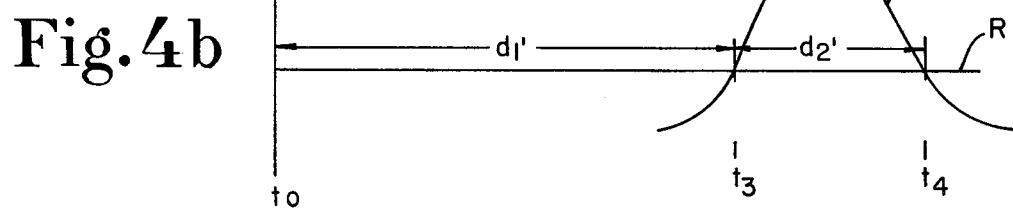
Figure 5:
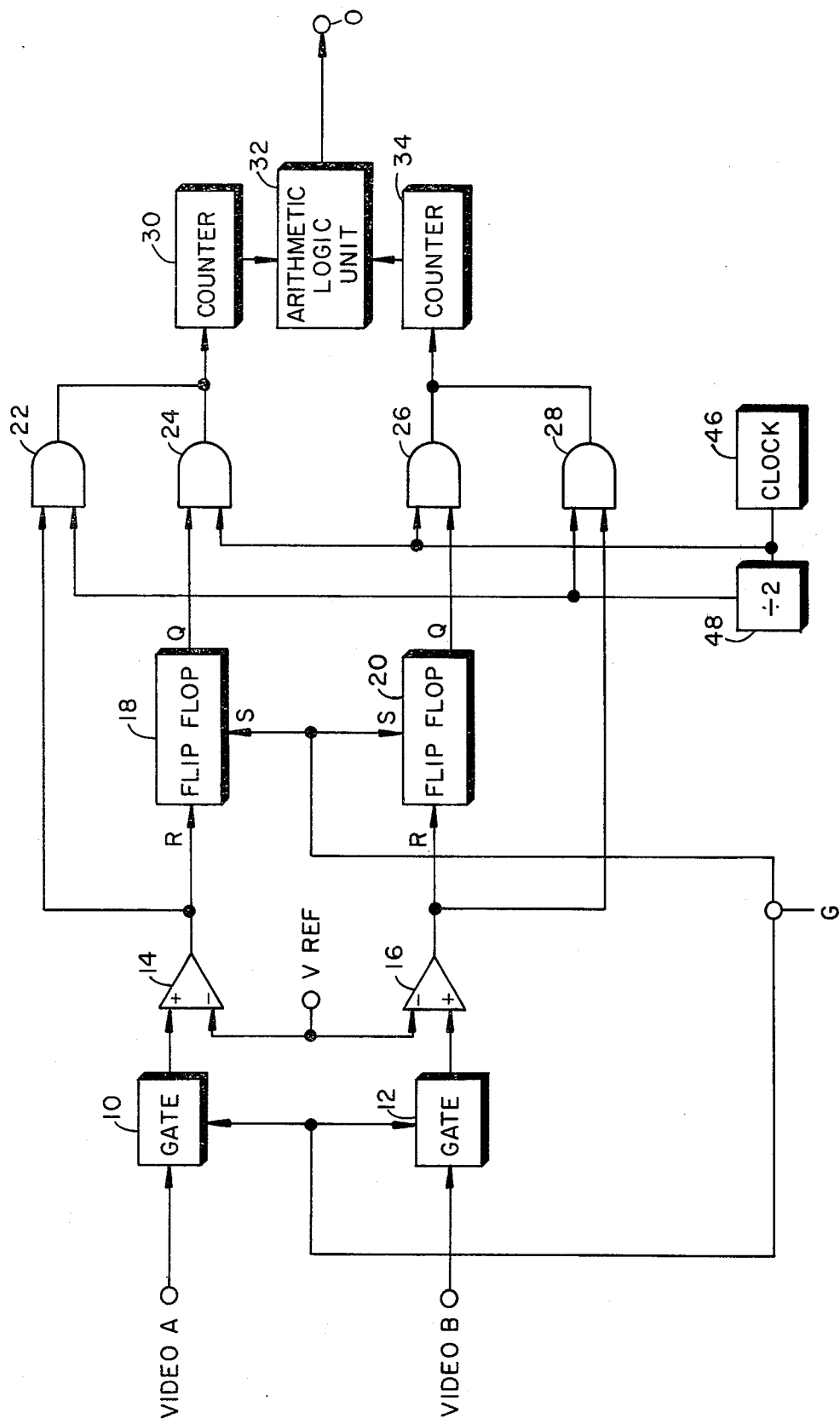
FIG. 5 is a block diagram illustrating one example of a raster registration detector in accordance with the present invention.

FIG. 5 illustrates an embodiment of raster registration detector 130 in accordance with the present invention, which overcomes the problems associated with conventional registration detectors utilizing edge detection. In FIG. 5, two raster related video signals corresponding, for example, to $V_R$ and $V_G$ of FIG. 1 and displaced, as illustrated in FIGS. 4a and 4b, are coupled to the input terminals of video gates 10 and 12. A gating signal G, which is derived from a line selector (not shown) enables gates 10 and 12 and resets flip-flops 18 and 20 all at a time $t_o$, as shown in FIGS. 4a and 4b. The enabling of gates 10 and 12 allows the raster related signals to appear at the output terminals of gates 10 and 12. The output video signals from gates 10 and 12 are, in turn, coupled to one input terminal of respective comparators 14 and 16. The other inputs of comparators 14 and 16 are coupled to a voltage reference $V_{REF}$, shown as a level R in the waveforms of FIGS. 4a and 4b; therefore, in operation, signals at the outputs of comparators 14 and 16 are low until the video signal amplitude of input video signals A and B increase to a point where they exceed the reference $V_{REF}$. At this point, the output of comparators 14 and 16 go high, although not necessarily at the identical time, if, as shown in FIGS. 4a and 4b, the video signals are displaced relative to each other. The output signals of comparators 14 and 16, in the form of either a low or a high signal level, are coupled in turn to the respective inputs of flip-flops 18 and 20 and to one input each of respective gates 22 and 28. The output of flip-flops 18 and 20 are coupled to one input each of respective gates 24 and 26. One input each of gates 26 and 24 is coupled to the output of a clock pulse generator 46 operating, for example, at a nominal frequency of 100 Megahertz. The clock output of clock 46 is also coupled to a divide-by-two circuit 48 and in turn to one input each of gates 22 and 28. The outputs of gates 22 and 24 are coupled in an "OR" configuration to the input of a counter circuit 30, while the outputs of gates 26 and 28 are coupled in an "OR" configuration to the input of a counter circuit 34. The outputs of counters 30 and 34 are coupled to respective inputs of an arithmetic logic unit 32 which, for example, may sum or subtract the number of counts stored in counters 30 and 34 for developing at an output terminal O the sum or difference of the total number of counts stored in counters 30 and 34.

The operation of the detector of FIG. 5 is as follows. With the input video signal A applied to gate 10, a gating signal G enables gate 10 and sets flip-flop 18 at a time $t_o$ (as shown in FIG. 4a). The output of flip-flop 18 thus enables gate 24, which couples clock pulse generator 46 to counter 30. Counter 30 continues to accumulate clock pulses until the video waveform reaches an amplitude equal to $V_{REF}$, corresponding to the time/-distance $d_1$, from $t_o - t_1$, of FIG. 4a. When the reference $V_R$ is exceeded at time $t_1$, the comparator 14 causes flip-flop 18 to change state, which disables gate 24 and simultaneously enables gate 22, which couples the one-half clock rate to the input of counter 30 for the time/-distance $d_2$, corresponding to the period $t_1 - t_2$ of waveform 4a. Counter 30 now has stored in its registers a number of counts equal to the clock pulses from time $t_o - t_1$ and a number of clock pulses at one-half the clock rate for the period of $t_1 - t_2$. Since the count stored during the time $t_1 - t_2$ is at one-half the clock rate or twice the period of the clock pulses during the time $t_o - t_1$, the total count in counter 30 represents the same count as if the same clock rate had been counted and stored in counter 30 for the period of time from $t_o - t_a$. Expressed mathematically in accordance with the relationship, *distance equals velocity* × *time:*

$$d_1 = V \cdot (\frac{1}{f} \times \text{number of counts } d_1) \quad (1)$$

and:

$$d_2 = V \cdot \left(\frac{\frac{1}{f}}{2} \times \text{number of counts } d_2\right) \quad (2)$$

or:

$$\frac{d_2}{2} = V \cdot (\frac{1}{f} \times \text{number of counts } d_2)$$

and the distance from $t_o$ to $t_a$ is:

$$dt_a = d_1 + \frac{d_2}{2} \quad (3)$$

then:

$$dt_a = V \cdot (\frac{1}{f} \times \text{number of counts } d_1) +$$

$$V \cdot (\frac{1}{f} \times \text{number of counts } d_2)$$

where:
V, the velocity of the beam is constant,

1/f is a constant, wherein f is the frequency of the clock pulse generator, therefore:

$dt_a$ = number of counts $d_1$ + number of counts $d_2$ or:

$dt_a$ = total number of counts in the counter.

In a similar fashion, video input B, corresponding to the waveform of FIG. 4b, applied to gate 12, is translated by comparator 16, flip-flop 20, gates 26 and 28 to accummulate a total count in counter 34 equal to the time/position of peak $t_b$ of video input B, as shown in waveform 4b.

Counters 30 and 34 now have stored in their respective registers a digital count representing the raster related peak video locations of $t_a$ and $t_b$. Arithmetic logic unit 32 subtracts one from the other to provide at output terminal O a digital number representing the position difference of the two rasters which generated the video A and video B signals. This digital number may be used directly, for example, in a microprocessor system utilized as control signal processor 140 for developing the desired control signal or, alternatively, stored in a digital accummulator and converted to a control signal by a digital-to-analog converter. The output of the digital-to-analog converter may be reduced to a dc control voltage suitable for coupling back in a closed loop system to the centering circuits of the raster generating circuits 160 of FIG. 1 for repositioning one of the rasters relative to the other.

Figure 6:
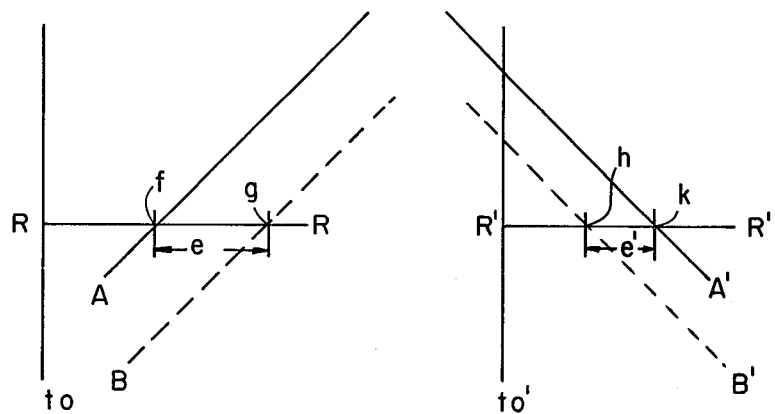
FIGS. 6 and 7 are graphical representations of representative reference patterns which may be used in carrying out the present invention.
Figure 8:
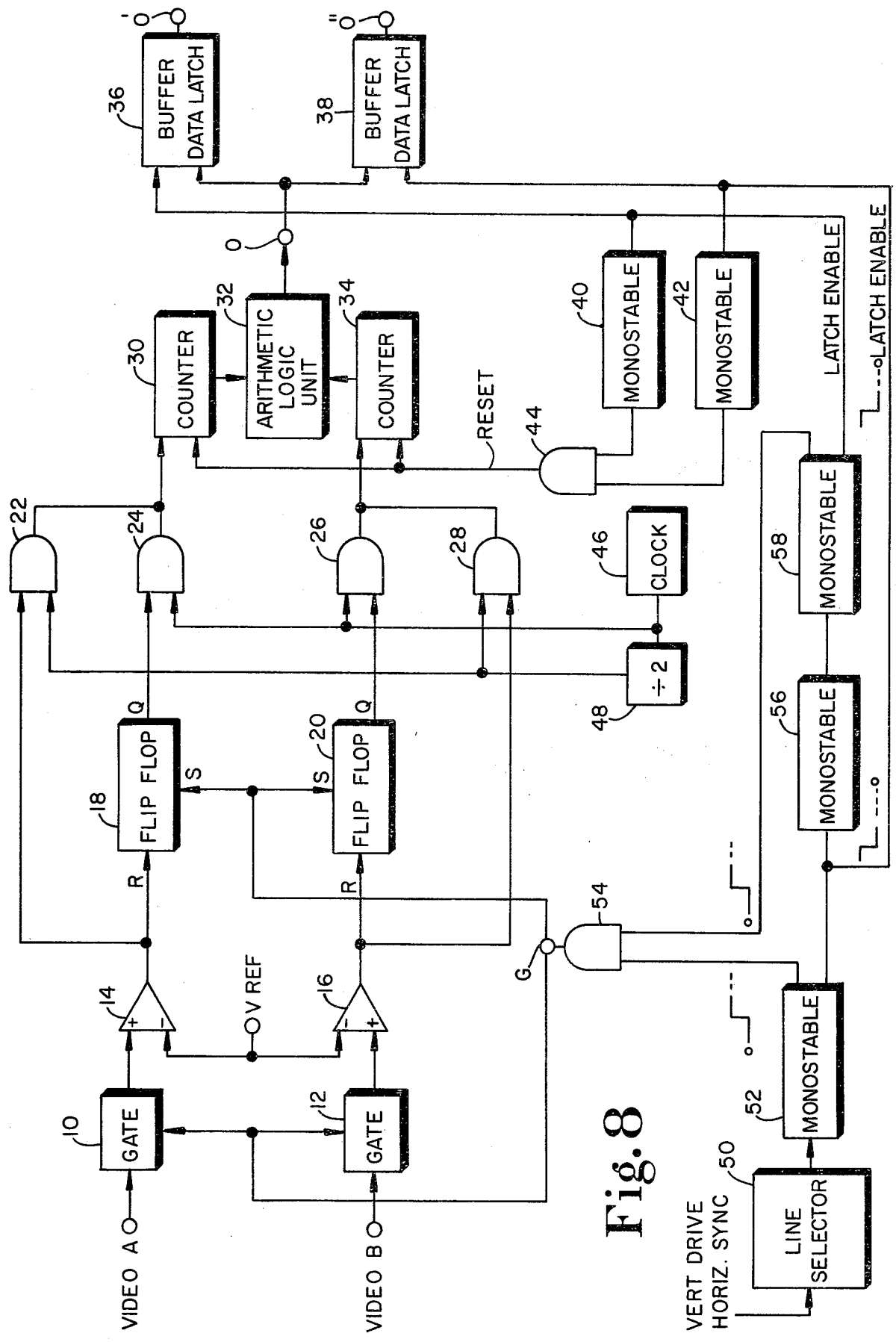
FIG. 8 is a block diagram illustrating a further example of a raster registration detector in accordance with the present invention.

Insofar as described, the detector of the present invention has been described in connection with only horizontal centering of the rasters by virtue of the selection of a single vertical white bar in the test pattern chart. FIG. 6 illustrates a reference pattern suitable for practicing the invention for both vertical and horizontal registration of the related rasters, while FIG. 8 illustrates the additional apparatus for the use of the detector of FIG. 5 for both vertical and horizontal registration detection. FIG. 6 illustrates a reference pattern containing two oblique white lines A – A', as seen by a first image pickup device, and two oblique white lines B – B', as seen by a second image device, the displacement being due to both horizontal and vertical misregistration of the related rasters. The detector of FIG. 5 is utilized in the circuit of FIG. 8 in a manner to be described below to locate the peak video amplitude for locations f and g, as well as locations h and k, at a reference level R – R' beginning at a time $t_o - t_o'$ for a common line, then the horizontal displacement is:

$$H = \frac{e + e'}{2} \quad (4)$$

and the vertical displacement is:

$$V = \frac{e - e'}{2} \quad (5)$$

where e equals the displacement between the peak video signals at f and g along the reference line R, and e' equals the displacement between the peak video signals at h and k along the reference line R', reference lines R and R' being on a common line.

FIG. 8 illustrates how the detector of FIG. 5 is utilized for both horizontal and vertical displacement. The operation of apparatus identified by like reference numerals is the same for both FIGS. 5 and 8. In FIG. 8, the line selector 50, which has coupled to its input reference signals related to the television system vertical and horizontal synchronizing signals, develops a line control signal by means of known divider circuits. The line control signal may, for example, be line 128 of a particular field, where the reference pattern is located in the approximate center of the raster, as illustrated in FIG. 7e. The output line control signal from line selector 50 is coupled to the input of a monostable multivibrator 52. The rising edge of the output signal from monostable multivibrator 52 is coupled to an OR gate 54 from which the gate signal G is coupled to gates 11 and 12 and to the set inputs of flip-flops 18 and 20. The duration of monostable multivibrator 52 is adjusted so that the length of the gating signal corresponds to the reference line R—R intersecting the oblique line pattern, illustrated by A and B of FIG. 6. During the duration of the gating signal, the detector stores the clock counts in counters 30 and 34, as previously described in connection with FIG. 5. At the end of the gating signal, as determined by monostable multivibrator 52, the trailing edge transition of monostable multivibrator 52, which is coupled to monostable multivibrator 56, monostable multivibrator 42, and data latch buffer 38, serves to recondition the detector portion of FIG. 8 to sample the right side of the pattern of FIG. 6, illustrated as lines A' − B' in the following manner. The trailing edge of the output signal from monostable multivibrator 52 is utilized as a latch enable signal for data latch buffer 38 so that the output of arithmetic logic unit 32, representing the digital quantity e of FIG. 6, is held in buffer 38 and is available at terminal O" for further processing to be discussed below. The output of monostable multivibrator 52 also sets monostable multivibrator 42, whose output is coupled to an OR gate 44 which, in turn, is coupled to the reset terminals of counters 30 and 34 so that they are cleared for the next measurement. The duration of monostable multivibrator 42 is adjusted to provide a delay sufficient to insure that the arithmetic unit 32 and data latch buffer 58 have completed their operation before the counters are reset. As previously stated, the output signal of monostable multivibrator 52 is also coupled to monostable multivibrator 56, the duration of which is adjusted to provide a delay in reestablishing the gating signal for making the measurement on the right side of the reference pattern, shown by lines A' − B' of FIG. 6. As in making the left side measurement, monostable multivibrator 58, which is triggered by the output of monostable multivibrator 56, generates a leading edge signal, which is coupled to OR gate 54. At the conclusion of the measurement of the right side of the reference pattern, monostable multivibrator 58 provides a latch enable signal, which transfers the right pattern side measurement to data latch buffer 36, where the count representing the digital quantity e' of FIG. 6 is made available at terminal O' and resets the counters 30 and 34 by means of monostable multivibrator 40 and OR gate 44. In this manner, the same detector is time shared for both the left and right side reference pattern measurements. Data latch buffers 38 and 36 now contain the left and right reference pattern measurements indicated by the quantities e and e'. Subsequent processing (not shown), for example, by the aforementioned microprocessor system utilized for control signal processor 140 or digital-to-analog conversion in accordance with equations (4) and (5), is now utilized to generate a horizontal and vertical correction signal for adjusting the horizontal and vertical centering in the raster generator circuits 160 of FIG. 1.

As previously described in connection with the apparatus and operation of FIG. 5, the red video signal $V_R$ was compared to green video signal $V_G$, and their misregistration corrected by means of a red-to-green difference control signal. In a three-color camera having three color rasters, the measurement sequence is repeated for the blue video signal compared to the green video signal and their misregistration corrected by means of a blue-to-green difference control signal. Thus, only two of the rasters, red and blue, require adjustment with respect to the green raster, which is designated as the reference raster.

Figure 7:
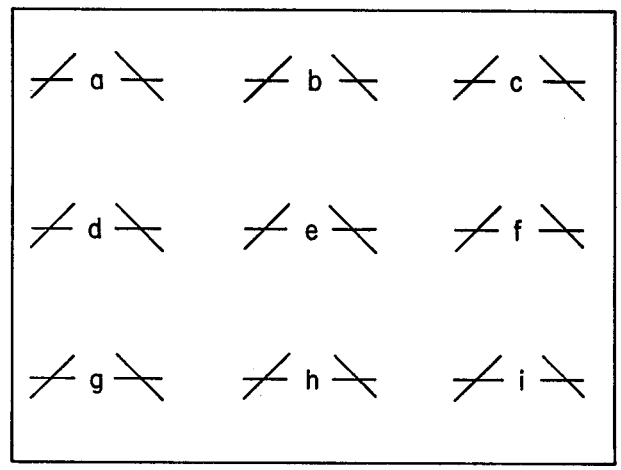

FIG. 7 illustrates a reference pattern which may be utilized for accomplishing total raster alignment in terms of horizontal and vertical centering, width, height, linearity, skew and rotation. As with the detector of FIG. 8, the line selector is reconditioned to generate line control signals, for example, line abc, def, ghi. Under control of additional logic circuitry, for example, of microprocessor (not shown), the detector of FIG. 8 may be time shared so that the left and right pattern measurements for each location, a through i, are stored in memory in their digital form for each raster comparison and further processed mathematically in digital form by the microprocessor to generate control signals for the parameters mentioned above in connection with total raster alignment.

What is claimed is:

1. A raster registration system for a television camera including at least two image pickup devices and means for developing related television rasters, said television rasters differing in position relative to each other with regard to a common scene imaged on said devices, comprising:

means for inserting a common signal generating reference having first and second boundaries in the image path of said image pickup devices for generating respective first and second raster related signals in said devices;

means for selecting at least one television line common to said television rasters, said line containing said raster related signals, said signals increasing in amplitude from said first boundary to a peak amplitude intermediate said first and second boundaries and decreasing in amplitude from said peak amplitude to said second boundary;

means for providing a common time reference on said common television line, said common time reference occurring prior in time and position to said common signal generating reference;

clock means for developing first and second reference frequencies;

first and second signal translating channels each having signal detector means for developing respective first and second gating signals when said first and second raster related signals exceed a given reference level;

first and second counter means coupled to said clock means and responsive to said common time reference signal and said respective first and second gating signals for counting said first frequency from said common time reference to said first and second gating signals, and for counting said second frequency during the duration of said gating signals, the total count of said first and second counters indicating the position of the peak amplitude of said raster related signals relative to said common time reference;

control means coupled to said first and second counters for developing a control signal in response to the difference in the counts of said counters indicative of the difference in position of said related television rasters; and means coupled to said raster developing means responsive to said control signal for minimizing said raster position difference.

2. A raster registration system for a television camera according to claim 1, wherein said common signal generating reference is a pattern chart comprising at least a white bar on a black background.

3. A raster registration system for a television camera according to claim 1, wherein said first reference frequency is f and said second reference frequency if f/2.

4. A raster registration system for a television camera according to claim 1, wherein said common signal generating reference is a pattern chart comprising at least a black bar on a white background.

5. A raster registration system for a television camera according to claim 4, wherein said raster related signals decrease in amplitude from said first boundary to a peak amplitude intermediate said first and second boundaries and increasing in amplitude from said peak amplitude to said second boundary.

6. A signal position detector for locating the position of the peak amplitude of a signal waveform having substantially uniform leading and trailing edges, comprising:

means for providing a reference level traversing said leading and trailing signal waveform edges;

means for providing a time reference, said time reference occurring prior in time and position to said signal waveform position;

clock means for developing first and second reference frequencies;

a signal translating channel having signal detector means for developing a gating signal when said signal waveform exceeds said reference level; and counter means coupled to said first and second clock means and responsive to said time reference signal and said gating signal for counting said first frequency from said time reference to said gating signal, and for counting said second frequency during the duration of said gating signal, the total count of said counter means indicating the position of the peak amplitude of said signal waveform.

7. A signal position detector according to claim 6, wherein said first frequency is f and said second frequency is f/2.

* * * * *